United States Patent

[11] 3,571,628

[72] Inventors Edwin J Braun
Middletown;
Stanley G. Student, Jr., Freehold, N.J.

[21] Appl. No. 739,874
[22] Filed June 25, 1968
[45] Patented Mar. 23, 1971
[73] Assignee Bell Telephone Laboratories Incorporated
Murray Hill, Berkley Heights, N.J.

[54] PULSE CIRCUIT
12 Claims, 4 Drawing Figs.

[52] U.S. Cl. .... 307/293, 307/265
[51] Int. Cl. .... H03k 17/28
[50] Field of Search .... 307/265, 267, 268, 293

[56] References Cited

UNITED STATES PATENTS

| | | | |
|---|---|---|---|
| 2,933,625 | 4/1960 | Townsend et al. | 307/293 |
| 3,056,890 | 10/1962 | Stoops et al. | 307/268 |
| 3,125,691 | 3/1964 | Astheimer | 307/267X |
| 3,218,575 | 11/1965 | Wittman | 307/268X |
| 3,265,933 | 8/1966 | Perry et al. | 307/293X |
| 3,281,630 | 10/1966 | Liang | 307/293X |

*Primary Examiner*—Donald D. Forrer
*Assistant Examiner*—R. C. Woodbridge
*Attorneys*—James Warren Falk and R. J. Guenther

ABSTRACT: A pulse timing circuit having an input transistor, a resistor-capacitor timing network, and an output transistor employs an amplifier connected between the timing capacitor and the output transistor to increase the output pulse width. The amplifier current gain increases the allowable value of the timing resistor and the network timing period.

INVENTORS: E. J. BRAUN
S. G. STUDENT JR.
BY: J S Cubert
ATTORNEY

PULSE CIRCUIT

BACKGROUND OF THE INVENTION

Our invention is related to pulse circuitry and more particularly to electronic timing and time delay circuits.

In digital equipment such as data processors and modern telephone systems, timing circuit are often extensively employed to control pulse duration and pulse timing. One such circuit type produces a pulse of predetermined duration in response to an input signal of greater duration. Another such circuit type delays the start of a pulse for a fixed time period in response to an incoming pulse. Both of these circuit types may employ similar arrangements of active devices and resistor-capacitor networks. Since the desired pulse duration or timing varies from application to application, a large variety of special circuits have generally been required in a given system. Where the time constants of the resistor-capacitor networks are long, large values of resistors and capacitors are often used. This usually necessitates circuit configurations which are adapted to operate at low values of current determined by the large values of resistors. Such circuits are critically dependent upon the accuracy of passive components and if semiconductor devices are used, the circuits are dependent on variations due to the operating temperatures of the devices.

Because of the large numbers of time delay and timing circuits used in a given system, it is desirable to employ a common circuit configuration which can be modified in a simple fashion to perform either function and to provide a wide range of pulse times. This permits the same circuit configuration to be used and advantageously results in greater economy and greater ease of maintenance. Where these circuits are each produced on a monolithic substrate in integrated form, the manufacturing cost may be substantially reduced if the aforementioned modifications can be made to a single type of integrated circuit package.

Where large values of resistors and capacitors are needed in integrated circuits it is preferable to us external devices for such components because such capacitors and resistors have more desirable characteristics and because there are limitations to the values which may be placed in the relatively small integrated circuit package. If the timing resistor is very large, currents conducted therethrough may not be compatible with the characteristics of semiconductor devices in the circuit. In this case it is known to insert additional amplification in the timing circuit to compensate for the low current, but known circuits of this type often use complex circuit configurations to provide the additional amplification.

Large capacitance values may be readily achieved in pulse timing circuits with electrolytic-type capacitors. But, timing capacitors are normally subject to voltages of alternating polarity during each of the operating sequences. As is well known in the art, the reverse polarization of electrolytic capacitors results in large variations in capacitance and high power dissipation which may damage such capacitors. Thus special circuit arrangements must be made in timing circuits incorporating electrolytic capacitors.

BRIEF SUMMARY OF THE INVENTION

Our invention is a pulse timing circuit wherein a timing network and amplifier transistor are inserted between input and output coupling means. Each coupling means may be a transistor. One terminal of the timing network capacitor is connected to the collector of a normally nonconducting input transistor and the other capacitor terminal is connected to the base of the amplifier transistor. The emitter of the amplifier transistor is connected to the base of an output transistor. A timing resistor is connected between the base and collector of the amplifier transistor and the amplifier transistor collector is returned via another timing resistor to a DC source. According to our invention, the current gain of the amplifier transistor increases the permitted value of the first timing resistor so that long duration time constants may be obtained.

According to one aspect of our invention, a series-connected circuit including a third transistor and a pair of semiconductor diodes is connected between the collector of the input transistor and a voltage source whereby the polarity of voltage across the timing capacitor is controlled during the operating sequence to limit the leakage current flowing therethrough and to provide for rapid recharge of the capacitor.

According to another aspect of one embodiment of our invention, a further transistor is connected between the emitter of the amplifier transistor and a ground reference potential to delay conduction of the output transistor whereby the circuit functions as a time delay circuit.

DETAILED DESCRIPTION

Figure 1:
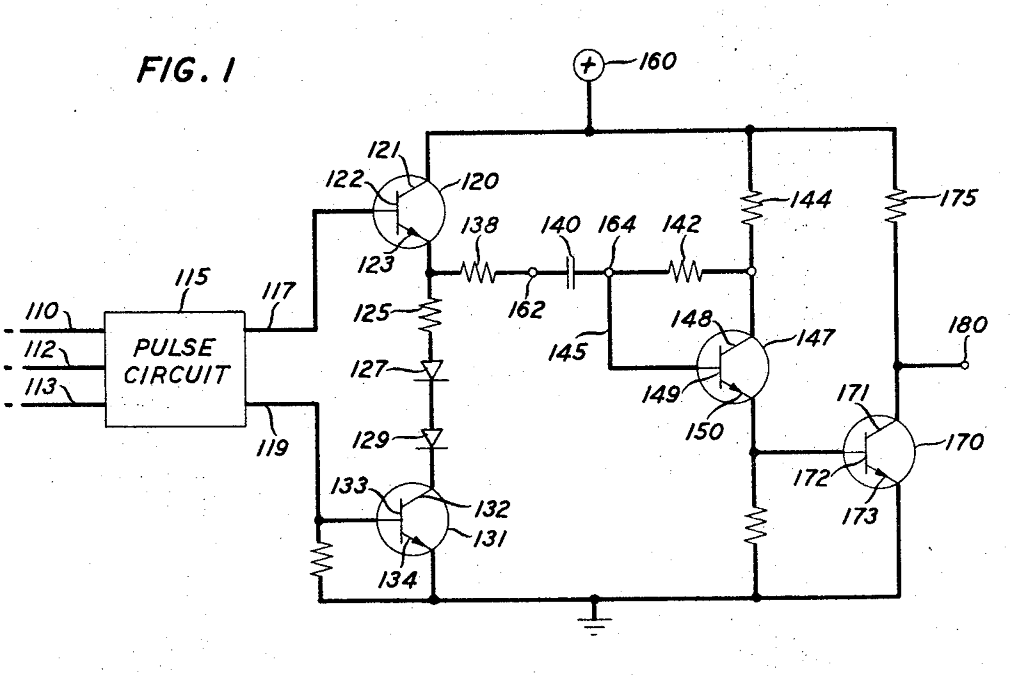
FIG. 1 depicts an illustrative embodiment of our invention which operates to produce a pulse of predetermined duration.

FIG. 1 shows a timing circuit illustrative of our invention which produces a pulse of fixed duration in response to an input signal of longer duration. Referring to FIG. 1, input pulses can be applied to any of the leads 110, 112 and 113. In the absence of such input pulses, pulse circuit 115 provides a positive voltage on lead 117 to permit transistor 120 to conduct and substantially zero voltage on lead 119 o:maintain transistor 131 nonconductive. Thus, in the absence of an input signal on any of leads 110, 112 and 113, transistor 120 conducts and current from positive voltage source 160 flows through collector 121, the collector-emitter path of transistor 120, emitter 123, resistor 125, diodes 127 and 129 and the collector-emitter path of input transistor 131 to a ground reference potential. Although transistor 131 is nonconductive, leakage current flowing therethrough s sufficient to cause the voltage at emitter 123 to be close to the voltage of positive source 160.

Transistor 147 is normally conductive because current flows from positive source 160 to base 149 of transistor 147 via resistors 144 and 142. This base current causes a much larger current to flow through the collector-emitter path of transistor 147 to the ground reference potential via the base-emitter path of transistor 170. Thus the voltage at point 164 is determined by the voltage across the series-connected, forward-biased, base-emitter paths of transistors 147 and 170. The transistor arrangement of FIG. 1 causes a positive voltage to appear from point 162 to point 164 so that capacitor 140 is charged in that direction. Since transistor 170 is normally conducting, current flows through resistor 175 and the voltage at output terminal 180 is very close to the ground reference potential.

Figure 2:
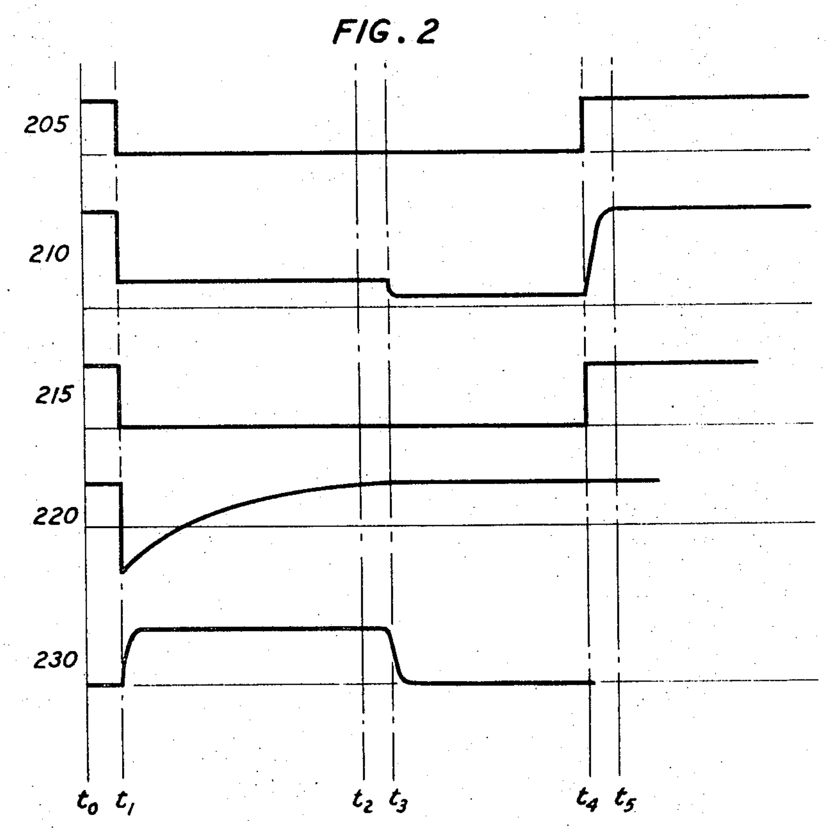
FIG. 2 shows waveforms useful in describing the operation of the circuit of FIG. 1.

When an input signal is applied to one of leads 110, 112 and 113, pulse circuit 115 responds thereto by providing a positive voltage on lead 119 and a voltage which prevents transistor 120 from conducting on lead 117. The input signal on one of leads 110, 112 or 113 is shown on waveform 205 of FIG. 2. The positive voltage on lead 119 is applied to base 133 and causes transistor 131 to conduct. The voltage on lead 117 at this time reverse biases the base-emitter path of transistor 120 so that this transistor is rendered nonconductive. Thus, just after time $t_1$, waveform 205 is substantially at the ground reference potential as is waveform 215 which appears at collector 132. The conduction of transistor 131 causes current to flow from source 160 through capacitor 140 via resistors 144 and 142 and through resistors 138 and 125, and diodes 127 and 129. Since the voltage across the fixed capacitor 140 cannot change instantly, the rapid negative voltage transition at point 162, shown at $t_1$ on waveform 210 is transmitted to base 149. This negative transition is caused by the turn-on of transistor 131 and the turnoff of transistor 120. Transistors 147 and 170 are both cut off at this time. Transistor 170 is now nonconductive and the voltage at output terminal 180 rapidly increases to substantially the voltage of positive source 160. The output waveform at terminal 180 is shown at $t_1$ on waveform 230. Thus, in response to a pulse applied to pulse circuit 115, the voltage output of the timing circuit of FIG. 1 shifts to a relatively high positive value.

Current now flows through capacitor 140 and timing resistors 142 and 144. This current provides an exponentially increasing voltage at terminal 164 as shown on waveform 220 between $t_1$ and $t_2$. The voltage at point 164 is not effective to render transistors 147 and 170 conductive until the conducting threshold voltage of the series-connected, base-emitter paths of transistors 147 and 170 is reached. This occurs at $t_2$. Between $t_1$ and $t_2$ the voltage at output terminal 180 remains positive. When the threshold voltage of the base-emitter paths of transistors 147 and 170 is reached at $t_2$, these transistors start to conduct and cause the voltage at terminal 180 to revert to the ground reference potential at $t_3$ on waveform 230. The change in waveform 230 occurs after transistors 147 and 170 are conducting. The circuit action described takes place as long as the input signal pulse from leads 110, 112 or 113 is applied to circuit 115. The input signal of waveform 205 is not removed until $t_4$. Thus a pulse of fixed duration appears at output terminal 180 in response to an input signal of longer duration.

After transistors 147 and 170 start to conduct again at $t_2$, capacitor 140 continues to charge until the voltage on lead 145 (waveform 220, FIG. 2) is limited by the forward conducting characteristics of the series-connected, base-emitter paths of transistors 147 and 170. Capacitor 140 retains its charge until the input signal to circuit 115 is removed at $t_4$. At that time, transistor 131 is rendered nonconductive and transistor 120 again conducts. When transistor 120 conducts, the voltage at emitter 123 starts to increase to a value somewhat less than that of positive source 160 and current flows from emitter 123 through resistor 138, capacitor 140 and the base-emitter paths of transistors 147 and 170. This current recharges capacitor 140 to its original condition in an exponential manner as shown on waveform 210 between $t_4$ and $t_5$. Resistor 138 limits the initial current flow through capacitor 140. After capacitor 140 is recharged at $t_5$ a second signal may be applied to circuit 115 to produce another positive pulse of fixed duration at terminal 180. Transistor 120 is connected as an emitter follower and, as is well known in the art, it provides a low impedance source which operates to rapidly recharge capacitor 140.

The circuit of FIG. 1 may be an integrated circuit in which all transistors and associated components except capacitor 140, resistor 142 and resistor 144 are formed on a single monolithic substrate. Capacitor 140, timing resistor 142, and timing resistor 144 may each be large in value so that a long duration output pulse is obtained. These components can advantageously be individual passive components mounted external to the integrated circuit substrate. In this way, the fixed pulse duration of the circuit may be altered to meet the requirements of any given application and the components on the substrate may be selected to provide greater economy and less dependence on temperature variations.

Transistor 147 is employed to amplify the small current through resistor 142. If this transistor were not used, the current through resistor 142 may be insufficient to render transistor 170 conductive to provide the needed circuit response or to accommodate utilization circuits connected to the output terminal 180. In the circuit of FIG. 1, resistor 144 provides current to the base of transistor 170 via the collector-emitter path of transistor 147. The current from emitter 150 is substantially greater than the current flowing through resistor 142 because of the current gain of transistor 147. The current through resistor 142 is reduced and the value of resistor 142 can be substantially increased without affecting the operation of transistor 170. In this way the duration of the output pulse from the circuit of FIG. 1 is not limited by the value of timing resistor 142 and very long duration pulses may be obtained.

When large values of capacitance are needed in the circuit of FIG. 1, capacitor 140 may be an electrolytic capacitor. As is well known in the art, the polarity of voltage across the electrolytic capacitor may not be reversed without causing the capacitor to act as a forward-biased diode. Such a reverse polarization of an electrolytic capacitor increases the power dissipation through the capacitor to an extent that may destroy or change the value of the capacitor.

The voltage at terminal 162 is always higher than the voltage at terminal 164 when transistors 147 and 170 are conducting and transistor 120 is also conducting. This is so because the voltage across series-connected diodes 127, 129 and transistor 131 due to current from transistor 120 is greater than the voltage across the two forward-biased, base-emitter junctions of transistors 147 and 170. In the time interval between $t_1$ and $t_3$, transistor 131 and diodes 127 and 129 are conducting due to the current through capacitor 140. In this interval the voltage at point 162 is also greater than the voltage at point 164.

Between $t_3$ and $t_4$, however, no current flows through capacitor 140 and the voltage at point 164 may be higher than that at point 162 so that reverse current flows through capacitor 140. But this reverse leakage current is substantially limited to a few microamperes because the leakage current increases the voltage drop across diodes 127 and 129. In this interval, the voltage at point 164 is determined by the voltage drops of the forward-biased base-emitter paths of transistors 147 and 170. Only leakage current flows through diodes 127 and 129 and the collector-emitter path of transistor 131. Therefore the voltage at point 162 drops at time $t_3$ and remains relatively constant until $t_4$. It should be noted that any change in the voltage drop due to temperature changes across the base-emitter junctions of transistors 147 and 170 when transistor 120 is conducting and when charging current flows through capacitor 140 is balanced by a substantially similar change in the voltage drop across diodes 127, 129 and transistor 131 so that the circuit of FIG. 1 is not affected thereby.

Figure 3:
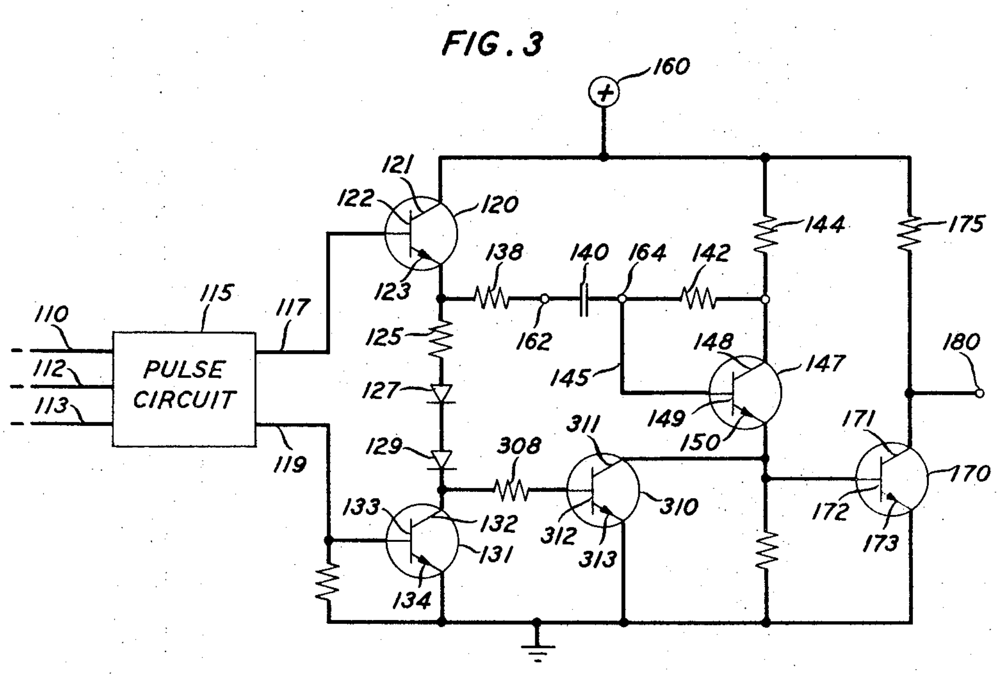
FIG. 3 depicts an illustrative embodiment of our invention which operates as a time delay circuit.

The circuit of FIG. 3 is substantially similar to the circuit described with respect to FIG. 1 except that resistor 308 and transistor 310 are inserted so that the circuit of FIG. 3 functions as a time delay circuit. These added components operate to allow output transistor 170 to conduct only after the end of the timing period determined by timing capacitor 140, timing resistors 142 and 144 and associated components. The waveforms associated with the operation of FIG. 3 are shown in FIG. 4.

Figure 4:
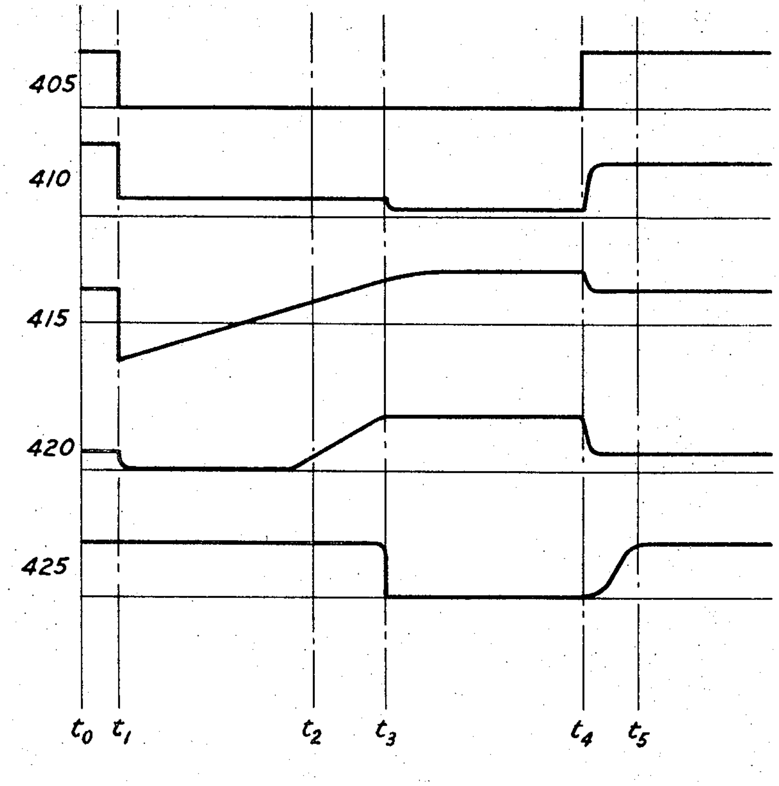
FIG. 4 shows waveforms useful in describing the operation of the circuit of FIG. 3.

Prior to time $t_1$ on FIG. 4, a positive voltage on lead 117 is applied to base 122 so that recharging transistor 120 is rendered conductive and substantially zero voltage on lead 119 is applied to base 133 to render input transistor 131 nonconductive, Since transistor 120 conducts, current is supplied via resistor 125, diodes 127 and 129 and resistor 308 to the base 312. This causes transistor 310 to conduct. The voltage at base 172 connected to collector 311 now prevents transistor 170 from being forward biased whereby transistor 170 is cut off. At $t_1$ an input signal is applied to one or more of leads 110, 112 and 113. This illustrated by the negative voltage transition of waveform 405 of FIG. 4. As discussed with respect to FIG. 1 this input voltage causes transistor 120 to be cut off and allows transistor 131 to turn on. The conduction of transistor 131 in turn cuts off transistor 310 and causes a negative voltage transition at base 172 so that transistor 170 becomes nonconductive. The voltages at point 162 and base 149 are shown in waveforms 410 and 415 of FIG. 4, respectively. Both transistors 147 and 310 become cut off at substantially the same time. Therefore no current is applied to base 172 at $t_1$ and transistor 170 is prevented from conducting at that time. The voltage at base 172 of transistor 170 is shown on waveform 420. Between times $t_1$ and $t_2$ the voltage at base 172 is substantially zero. The voltage at point 164 (waveform 415) between $t_1$ and $t_2$ increases exponentially toward the voltage at positive source 160. At $t_2$, transistor 147 begins to conduct so that transistor 170 starts to conduct at $t_3$. Because transistor 310 is nonconductive between $t_2$ and $t_3$, the voltage at the junction of base 172 and collector 311 increases in this interval. Shortly after $t_3$, the voltage at point 164 is limited by the forward voltage drop of series-connected, base-emitter paths of transistors 147 and 170.

Between times $t_3$ and $t_4$ an output pulse appears at output terminal 180 (waveform 425). This is due to the conduction of transistor 170. The turn-on of transistor 170 is delayed from $t_1$ to $t_3$ by the operation of the timing network including capacitor 140 and resistors 142 and 144 and transistors 147 and 310. At time $t_4$ the input signal is removed. Transistor 310 is then rendered conductive and the output voltage at terminal 180 (waveform 425) returns to a relatively high positive level.

Transistor 120 conducts at $t_4$ and current from emitter 123 flows through resistor 138 and capacitor 140 to recharge this capacitor to its original state. This is shown on waveform 410 between $t_4$ and $t_5$. Current also flows through resistor 125, diodes 125, diodes 127 and 129, resistor 308 and the base-emitter path of transistor 310. The current from resistor 308 turns on transistor 310 and transistor 170 becomes nonconducting in the interval between $t_4$ and $t_5$. Because transistor 170 is nonconductive, waveform 415 reverts to a lower voltage which represents the base-emitter voltage of transistor 147 and the collector-emitter voltage of transistor 310.

Resistor 138 limits the initial current through capacitor 140 so that current is available to render transistor 310 conductive. Resistor 125 limits the current from emitter 123 in the event that transistor 120 turns on before transistor 131 is cut off. At time $t_5$, capacitor 140 is completely recharged to its original state and the circuit is ready to accept another input on one of leads 110, 112 and 113. In accordance with our invention, the circuit of FIG. 3 provides a fixed time delay whereby a output signal appears at terminal 180 only after the fixed delay subsequent to the application of an input pulse to circuit 115.

As discussed with respect to the circuit of FIG. 1, the circuit of FIG. 3 may be manufactured in integrated form. As is well known in the art, it is only necessary to change the metalization pattern of a basic timing circuit to obtain either the circuit of FIG. 1 or the circuit of FIG. 3. The removal of the lead interconnecting collector 311 and base 172 and the lead connecting collector 132 with resistor 308 provides the timing circuit of FIG. 1. As in the circuit of FIG. 1, the time delay circuit of FIG. 3 advantageously uses amplifier transistor 147 to permit high values of resistor 142 to be employed whereby long duration time delays may be obtained.

While the principles of our invention have been described in connection with specific illustrative embodiments, it is to be understood that the description is merely illustrative of the principles of our invention and numerous modifications may be made therein and other embodiments may be devised without departing from the spirit and scope of the invention.

We claim:

1. A pulse generating circuit comprising first and second coupling devices each having input, output and control electrodes, a voltage source, means for applying a signal to said first coupling device control electrode, and pulse timing means coupled between said first coupling device output electrode and said second coupling device control electrode, said timing means comprising a timing capacitor having two terminals, first and second resistors for charging said timing capacitor and an amplifying device having input, output and control electrodes, means for connecting one timing capacitor terminal to said first coupling device output electrode, the other timing capacitor terminal being connected to said amplifying device control electrode, said first charging resistor being connected between the control and output electrodes of said amplifying device, said second charging resistor being connected between said amplifying device output electrode and said voltage source, and said amplifying device input electrode being connected to said second coupling device control electrode.

2. A pulse generating circuit according to claim 1 further comprising resistor means and a transistor switch having a base, an emitter and a collector, said resistor means being connected between said first coupling means output electrode and said transistor switch base, said transistor switch collector being connected to said second coupling device control electrode and said transistor switch emitter being connected to a reference potential, said transistor switch being operative in response to said signal to delay the operation of said second coupling device.

3. A pulse generating circuit according to claim 1 further comprising means connected to said one capacitor terminal responsive to the termination of said signal for recharging said capacitor.

4. A pulse generating circuit according to claim 3 wherein said recharging means comprises a transistor having an emitter, a base and a collector, said transistor base being connected to said input signal applying means, said transistor collector being connected to said voltage source, and said transistor emitter being connected to said one capacitor terminal.

5. A pulse generating circuit according to claim 4 wherein said connecting means comprises a pair of series-connected like-polarity diodes responsive to said signal for transmitting a selected polarity signal from said first coupling device output electrode to said one capacitor terminal.

6. A pulse forming circuit comprising first, second and third transistors each having a base, an emitter and a collector, the second transistor emitter being connected to the third transistor base, a voltage source, means for rendering said first transistor nonconductive an said second and third transistors conductive, timing capacitor means having two terminals means for connecting one of said timing capacitor terminals to the first transistor collector, means for connecting said other timing capacitor terminal to the second transistor base, means for applying an input signal to the first transistor base to render said first transistor conductive and said second and third transistors nonconductive, said means for rendering said second and third transistors conductive comprising first resistive means connected between said voltage source and said second transistor collector and second resistive means connected between the base and collector of said second transistor for charging said timing capacitor.

7. A pulse forming circuit according to claim 6 wherein said first and third transistor emitters are connected to a common reference potential, and further comprising means for blocking the conduction of said third transistor during said charging period including a resistor and a fourth transistor having a base, an emitter and a collector, said resistor being connected between said first transistor collector and said fourth transistor base, said fourth transistor collector being connected to said third transistor base and said fourth transistor emitter being connected to said common reference potential.

8. A pulse forming circuit comprising input and output transistors each having a base, an emitter and a collector, means for applying a pulse to said input transistor base to turn off said input transistor, and means connected between said input transistor collector and said output transistor base responsive to said pulse for controlling said output transistor conduction for a predetermined time, said output transistor conduction controlling means comprising capacitor coupling means, means for connecting said capacitor to said input transistor collector, an amplifying transistor having a base, a collector and an emitter, means for connecting said capacitor to the amplifying transistor base, and a resistor network connected between the base and collector of said amplifying transistor and to a voltage source for charging said capacitor, said amplifying transistor emitter being connected to said output transistor base.

9. A pulse forming circuit according to claim 8 wherein said capacitor coupling means comprises an electrolytic capacitor an said means for connecting said capacitor to said input transistor collector comprises a pair of series-connected diodes, said diodes being operative to limit the reverse polarization of said capacitor.

10. A pulse forming circuit according to claim 8 characterized in that said output transistor conducts for said predetermined time in response to said applied pulse being of longer duration than said predetermined time.

11. A pulse forming circuit according to claim 8 further comprising a resistor and a switching transistor having a base, an emitter and a collector, said resistor being connected between said input transistor collector and said switching transistor base, said switching transistor collector being connected to said output transistor base and said switching transistor emitter being connected to said output transistor emitter whereby the conduction of said output transistor is blocked for said predetermined time.

12. A pulse forming circuit according to claim 8 wherein said output transistor conduction controlling means is operative in response to said applied pulse to turn off said output transistor for said predetermined time.